United States Patent
Thibeaumont et al.

(10) Patent No.: US 8,673,247 B2
(45) Date of Patent: Mar. 18, 2014

(54) METHOD FOR OPERATING A REGENERATIVE SHAFT FURNACE FOR PRODUCING LIME

(75) Inventors: Etienne Thibeaumont, Villers le Bouillet (BE); Benoit Boone, Faulx-les-Tombes (BE); Jean-Yves Tilquin, Villers le Bouillet (BE)

(73) Assignee: Cameuse Research and Technology, Louvain-la-Neuve (BE)

( * ) Notice: Subject to any disclaimer, the term of this patent is extended or adjusted under 35 U.S.C. 154(b) by 625 days.

(21) Appl. No.: 13/003,415

(22) PCT Filed: Jul. 8, 2009

(86) PCT No.: PCT/EP2009/058664
§ 371 (c)(1),
(2), (4) Date: Feb. 25, 2011

(87) PCT Pub. No.: WO2010/003978
PCT Pub. Date: Jan. 14, 2010

(65) Prior Publication Data
US 2011/0229387 A1 Sep. 22, 2011

(30) Foreign Application Priority Data
Jul. 10, 2008 (BE) .................................. 2008/0382

(51) Int. Cl.
*C04B 2/10* (2006.01)

(52) U.S. Cl.
USPC ........... 423/175; 423/155; 423/173; 423/579; 423/583

(58) Field of Classification Search
None
See application file for complete search history.

(56) References Cited

U.S. PATENT DOCUMENTS

| | | | |
|---|---|---|---|
| 3,499,636 A * | 3/1970 | Hall | 423/177 |
| 3,617,583 A | 11/1971 | Moss | |
| 3,633,894 A | 1/1972 | Sunnegren | |
| 4,382,779 A * | 5/1983 | Fussl | 432/25 |
| 5,380,505 A | 1/1995 | College | |
| 5,837,028 A * | 11/1998 | Quirk et al. | 65/134.6 |
| 2001/0029005 A1* | 10/2001 | Piringer et al. | 432/19 |
| 2006/0286494 A1* | 12/2006 | Hannes | 431/11 |

FOREIGN PATENT DOCUMENTS

WO    WO 2004/089842    10/2004

OTHER PUBLICATIONS

International Search Report for Application No. PCT/EP2009/058664 (6 page).

* cited by examiner

*Primary Examiner* — Melvin C Mayes
*Assistant Examiner* — Douglas Call
(74) *Attorney, Agent, or Firm* — Kevin R. Erdman; Mark C. Reichel; Reichel IP LLP

(57) ABSTRACT

The invention relates to a method for producing quick lime from lime stone in a continuous regenerative shaft kiln, characterized in that, starting with standard conditions of excessive combustion air for the operation of this kiln, it especially includes a step where the excessive combustion air is progressively reduced until a content greater than 1000 ppm (in volume) of carbon monoxide is reached in the connection flue between the tanks. An increase in the content of gaseous sulphur dioxide is then observed in the gas flue, with respect to a kiln operated in standard conditions.

20 Claims, 3 Drawing Sheets

METHOD FOR OPERATING A REGENERATIVE SHAFT FURNACE FOR PRODUCING LIME

CROSS-REFERENCE TO RELATED APPLICATION

This application is a National Stage filing of International Application Serial No. PCT/EP2009/058664, filed Jul. 8, 2009 and designating the United States, which claims priority to Belgium Application Serial No. 2008/0382, filed Jul. 10, 2008, the entire disclosures of which are expressly incorporated herein by reference.

FIELD OF THE INVENTION

The invention relates to a method for operating regenerative type shaft kilns used to produce lime. This method for operating the kilns allows raw materials and/or fuels containing sulphur to be used for applications that require low sulphur contents in the lime produced.

DESCRIPTION OF THE PRIOR ART

The production of quick lime (CaO) by the decarbonatation of lime stone has been used throughout the ages but it was in the twentieth century that the kiln technologies were strongly developed. The production of lime using "intermittent" type technologies progressively developed to continuous kilns.

Single tank vertical kiln systems and rotary kilns with and without preheating were progressively developed. These technologies revolutionised the means of producing lime; nevertheless, les energy efficiencies of these kilns remained limited.

The developments of regenerative type shaft kilns with two or more than two tanks were described in the Austrian patent 211, 214 and the article in the journal Zement Kalk and Gips n°6, 1980 p 217. These kilns produced good quality lime with low specific consumption. Specific consumption is the quantity of heat used to produce one kg of lime.

The U.S. Pat. No. 4,382,779 describes an improvement to these kilns in order to limit the recarbonatation of the lime in the kiln.

The problem in reducing the sulphur in the lime produced has already been covered by many patent registrations for other types of lime kilns.

The American U.S. Pat. No. 3,499,636 describes the use of a rotary kiln which limits the oxygen content in the discharge zone in order to reduce the sulphur content in the lime.

The American U.S. Pat. No. 3,633,894 describes a method of reducing the sulphur in the lime in an annular kiln.

The American U.S. Pat. No. 3,617,583 describes the calcination of the lime stone in a fluidised bed kiln where the sulphur from the fuel is in the majority extracted from the smoke.

The American U.S. Pat. No. 5,380,505 describes a method of producing lime with low sulphur content by means of a rotary kiln system and the addition of fine particles of hydrated lime.

The application PCT WO 2004/089842 describes a system for operating rotary kilns with preheating to limit the sulphur content in the lime.

However, none of these documents proposes a method for producing quick lime from lime stone in a continuous regenerative shaft kiln, starting from standard operating conditions and with usual raw materials and fuels, whilst also reducing the problems related to the presence of sulphur compounds.

BRIEF DESCRIPTION OF THE DRAWINGS

The detailed description of the invention particularly refers to the accompanying figures in which.

DESCRIPTION OF THE INVENTION

Figure 1:
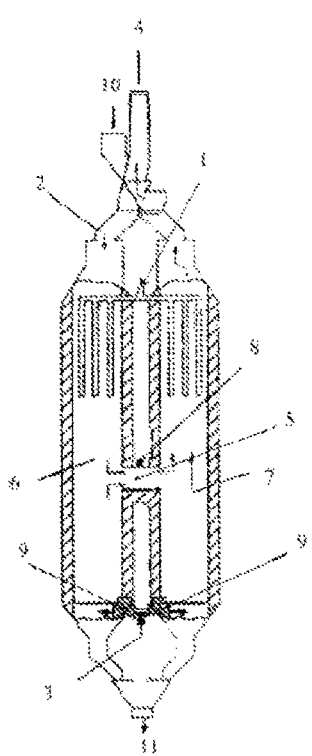
FIG. 1 is a cross-sectional view of a regenerative type shaft kiln used to produce lime.

Certain types of lime stone and fossil energy used for lime kilns naturally contain sulphur.

There are different types of fossil energies that may be used for lime kilns. In general, their prices vary especially according to their sulphur content.

By way of example, if the sulphur content of certain fossil energies in Western Europe are considered at the end of the first quarter 2007, such as natural gas (0.0% in weight), lignite (0.35%), coal (2.6%) and petroleum coke (5.0%), it may be seen that the cost in Euros per GigaJoule (GJ) produced is exactly in the opposite order: petroleum coke (2.87 Euro per GJ), coal (2.96), lignite (3.32) and natural gas (4.95). It may be observed that the cheapest fossil energies are those which are contain the most sulphur.

Given that sulphur is generally trapped in the majority by the lime and that certain applications require lime containing a limited quantity of sulphur, the use of fossil fuels with high sulphur content is not possible.

Another source of sulphur is of course the lime stone used to produce the lime: this lime stone is for example more or less rich in pyrite.

Typically for use is metallurgy, the maximum sulphur contents in the lime are limited to 0.1% in weight, or often to 0.03%.

The purpose of this invention is therefore to propose a method which permits lime stones and fossil fuels which contain sulphur to be used, whilst also reducing the problems related to the presence of sulphur.

Based on general thermodynamic principles, the balance between calcium oxide (CaO), oxygen (O2) and sulphur dioxide (SO2) may be described as follows:

$$CaO + \tfrac{1}{2} + SO2 \leftrightarrow CaSO4$$

This reaction progresses in one direction or another in function of variables such as the excessive combustion air and the temperature in the different zones of the process.

If the temperature drops and/or the oxygen content rises, the sulphur is captured by the calcium oxide.

If the temperature rises and/or the oxygen content drops, the sulphur is "extracted" from the calcium oxide and is this in gaseous form.

Moreover, based on the same principle of balance, other reactions between these same compounds may be highlighted, especially in the case where we have carbon monoxide or CO (in a reducing atmosphere). In this case, the following reaction takes place and is also heavily dependent on the variables of the process:

$$CaO + SO2 + 3CO \leftrightarrow CaS + 3CO2$$

If the temperature drops and/or the CO content rises, the sulphur is "fixed" by the calcium oxide.

If the temperature rises and/or the CO content drops (whilst conserving a reducing atmosphere), the sulphur is again oxidised and is in gaseous form.

Apart from the thermodynamic aspects, the kiln used also needs to be considered.

The regenerative type kiln is shown in FIG. 1. This type of kiln consists of two tanks (circular or rectangular) (6) and (7) that are interconnected in their central part by a connection flue (5).

The tanks are loaded from the top (10) at regular intervals with calcium (and/or magnesium) carbonate in stones. The final product CaO is discharged regularly from the base of the tanks (11).

The fuel arrives by the inlet (1), the combustion air by the outlet (2), whereas the cooling air arrives in (3). The gases leave the kiln by the outlet (4). The two main modifications are the installations of appliances which permit the measurement (8) of the temperature and composition of the gases in the gas flue, as well as the fitting of automatic valves (9) on the cooling air inlet.

The carbonate introduced passes successively through the preheating (to the end of the rods injecting the fuel), decarbonatation (from the end of the rods to the height of the connection flue between the two tanks), and cooling (from the gas flue to the lime discharge device) zones.

The operation of the kiln is broken down into two periods of equal duration of around 8 to 15 minutes.

During the first period, the fuel is injected through the rods of tank n°1 and enters into combustion with the combustion air injected into the upper part of this tank.

The energy discharged is used to decarbonate the stones present in tank n°1. An additional quantity of air is injected into the base of each tank to cool the calcium oxide produced.

The cooling air injected into the base of the tank n°1 as well as the gases from the combustion in tank 1 join and pass through the connection flue. They then mix with the cooling air injected at the base of tank n°2 before passing through the entire height of the product located in tank n°2.

In doing so, the stones present in the upper part of tank n°2 "capture" the majority of the energy present in this gaseous mixture. If this method continues in this way, the temperature of the gases escaping from the chimney would considerably exceed 500° C.

This is why, after 8 to 15 minutes, the second period starts. The injection of fuel and combustion air into tank n°1 is interrupted. A load of stones is injected in the tank(s). Then, the fuel and the combustion air are injected into tank n°2 while the combustion gases and the cooling air are evacuated through tank n°1.

The operating principle described above takes the following aspects into account:

The bed of stones shown in the preheating part of each tank acts as a "regeneration" heat exchanger. The excess energy contained in the gases leaving the tank in combustion is transferred to the stones in the preheating zone of the tank n°2 during the first step. Part of this heat is then transferred from the stones to the combustion air. This combustion air reaches temperatures of almost 800° C.

The decarbonatation of the lime is terminated at the level of the connection flue at a relatively moderate temperature of 1100° C. These conditions favour the production of highly reactive lime. The final product may if required, be produced with a relatively low residual CaCO3 content.

A standard kiln may be fed with stones ranging between 25 and 130 mm in size. Usually, the ratio between the dimensions of the smallest and largest is kept close to 2 (sizes ranging from 40 to 80 mm for example). The specific consumption of a kiln of this type is around 3678 kiloJoules per kilogram (kJ/kg) lime produced.

In order to apply the method of the invention, the kiln will be quipped with a gas analyser which measures the gases in the connection flue and thermocouples and/or optical pyrometers fitted in the connection flue in order to measure the temperature.

Furthermore, the lime extracted from the kiln is analysed regularly in order to measure the residual content of CaCO3 and the sulphur content, which must of course remain within the production tolerances.

The operation of the kiln is heavily based on the values of these three groups of measurements. Overall, it may be stated that the sulphur is mobilised in the gaseous form in one or several specific positions in the kiln by means of precise monitoring of the above information and by adjusting:

the specific consumption (kJ/kg of lime produced);
the excessive combustion air;
the distribution of the cooling air between the combustion tank and the preheating tank.

In order to apply the method of the invention, a first step will be carried out beginning with a kiln operating with standard conditions. By standard conditions, it is meant the normal conditions for the operation of such a kiln, especially considering the different temperatures, the excessive combustion air, the cooling air, the specific consumption, etc.

During this first step, the flow rate of the combustion air is progressively reduced by at least 10% with respect to the standard conditions of combustion air, given that a normal value for this type of kiln is from 100 to 130% of the stoichiometric requirements. The reduction of at least 10% is calculated in relative value.

Consequently, if the kiln operates normally with excessive combustion air of 130% of the stoichiometric requirements, during the first step, then it must be progressively lowered to below 117% of excessive combustion air.

Similarly and again by way of example, if starting with 120% of excessive combustion air in standard conditions, then it must be progressively lowered to below 108% of excessive combustion air. if starting with 110% of excessive combustion air in standard conditions, then it must be progressively lowered to below 99% of the stoichiometric requirements.

The measurements of the gas analyser CO, O2 and SO2 measuring the values at the connection flue are carefully monitored.

The reduction of the flow rate of excessive combustion air is stopped when the presence of the post-combustion phenomenon is detected in the gas flue. This is characterised by a high CO content and also by a strong increase in the temperature in the connection flue. This phenomenon takes the kiln to a situation of imbalance that is difficult to control.

It may be noted at this point the concentration of SO2 in the connection flue between the tanks.

The first step described above may be followed by a second optional step facultative if the temperature of the gas flue has not yet reached the maximum authorised values in the kiln. This second step consists of progressively increasing the temperature of the connection flue up to at least 1050° C. This limit depends however on the characteristics of the refractory coating in the gas flue. This increase in temperature is obtained by increasing the specific consumption of the kiln (kJ/kg of lime produced). One possible alternative consists of increasing this temperature to 1100° C., if this does not lead to the coating of the kiln being damaged.

During this second step, a high concentration of SO2 must be maintained in the connection flue between the tanks.

A third step which may be implemented either after the first (if the temperature is already a limiting factor) or after the second, consists of reducing the quantity of cooling air injected into the base of the tank where the combustion takes place. This approach favours the "vaporisation" of the sulphur in gaseous form whilst still conserving a low oxygen content in the gases in the gas flue.

The flow rate is thus progressively reduced until the temperature of the lime does not exceed 150° C. It is important to point out that the reduction in the flow rate in the combustion tank is compensated by an increase in the flow rate in the preheating tank. In this way, we conserve an air ratio expressed in Newton-cubic meter per kilogram ($Nm^3/kg$) of lime produced close to 0.65.

The adjustments described in this third step lead to a high concentration of SO2 being maintained in the gas flue.

The invention thus relates to a method for producing quick lime from lime stone in a continuous regenerative shaft kiln. This method is characterised in that, starting with standard conditions of excessive combustion air for the operation of this kiln, it includes a step where the excessive combustion air is progressively reduced until a content greater than 1000 parts per million (ppm) (in volume) of carbon monoxide is reached in the connection flue between the tanks.

Following the first step, this method may include a second step where the temperature of the kiln is progressively increased, until the temperature reaches at least 1050° C. in the gas flue.

Directly after the first step or the second step, this method may include a subsequent step where the volume of cooling air of the combustion tank is progressively reduced, until the temperature of the lime produced does not exceed 150° C.

The standard conditions of excessive combustion air for the operation of this kiln correspond to an excess of air of between 100% and 130% of the stoichiometric value.

The first step of this method is characterised in that the excessive combustion air is progressively reduced by at least 10% with respect to the standard conditions of combustion air for the operation of this kiln.

The second step of this method may be characterised in that the temperature reaches 1100° C. in the gas flue.

By using the method according to the invention, it may be noted that an increase in the content of gaseous sulphur dioxide is observed in the gas flue, with respect to this kiln operated in standard conditions.

EXAMPLE

The Applicants ran a production batch of 30 days with a regenerative shaft kiln whose nominal capacity is 220 tons of lime a day, using petroleum coke as fuel.

The operating parameters of the kiln were progressively adapted at the start with standard values, in order to encourage a strong concentration of SO2 in the connection flue.

In order to run this production batch, the Applicants fitted the following instruments and devices: a gas analyser measuring the gases in the connection flue between the two tanks, automatic valves on the cooling air inlets to each tank; a gas analyser on the inlet and exit of the bag filter which retains the solid particles in the gas flow emitted by the kiln.

During the entire production run, the Applicants measured and collected many samples of the flows entering (fuel, stones) and leaving (lime, filter dust, combustion gases, etc.).

It should be noted that the production of the kiln was kept constant.

Figure 2:
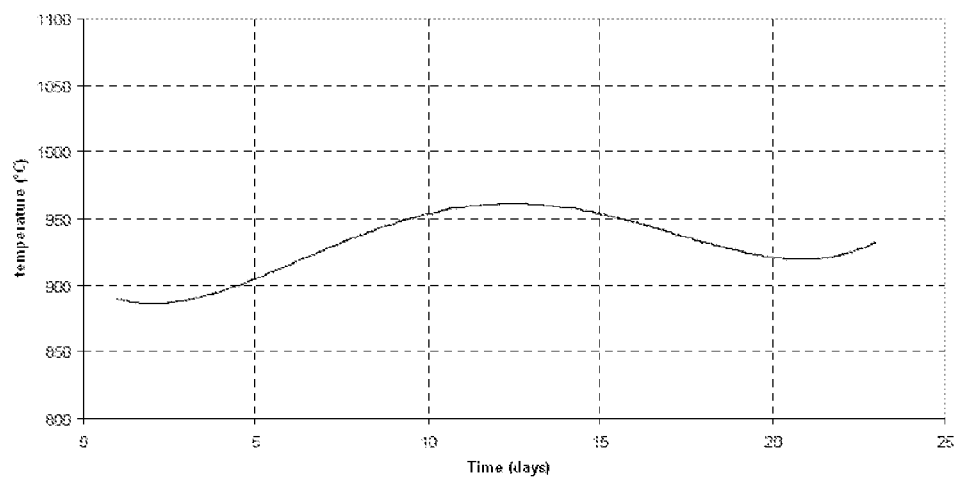
FIG. 2 is a graph showing the change in mean temperature in a connection flue of the shaft kiln of FIG. 1 over time.

FIG. 2 shows the change in the mean temperature in the connection flue of the tanks, in time ("temps") expressed in days ("jours").

Figure 3:
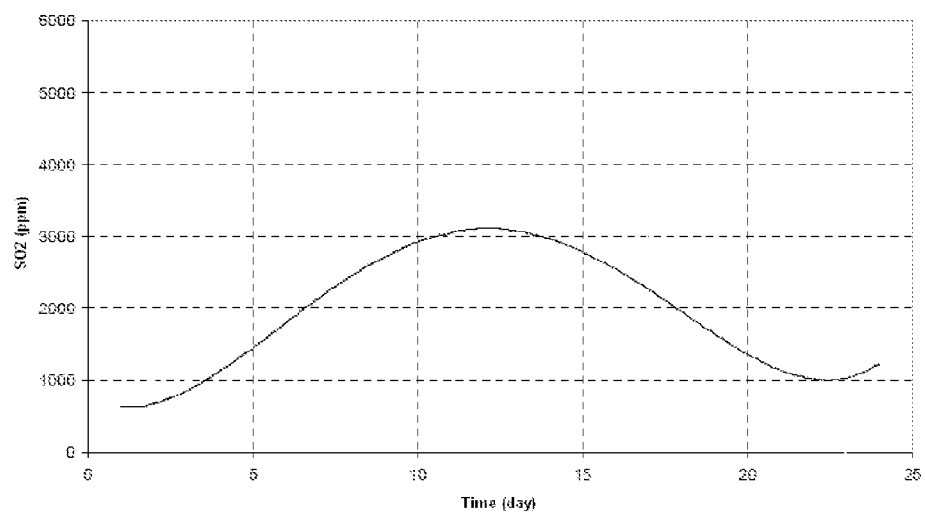
FIG. 3 is a graph showing the change in concentration of SO2 in the connection flue over time.

FIG. 3 shows the change in the concentration of SO2 at the same position, in time ("temps") expressed in days ("jours").

The first phase (approximately days 1 to 6) consisted of stabilising the method in normal conditions. During this phase, the specific consumption was 3600 kJ/kg lime and the excessive air standard. This excess air was 124% with respect to the stoichiometric requirements of the combustion.

As usual on regenerative kilns, the cooling air was distributed equally between the combustion tank and the preheating tank.

During the second phase (approximately days 6 to 11), the excessive air was progressively reduced to 109% of the stoichiometric requirements.

Subsequently the following was observed:
an increase in the mean concentration of SO2 in the gas flue from 500 ppm to 3000 ppm; it should be noted that during this same phase, peaks of SO2 of up to values of around 7700 ppm were observed;
an increase in the mean temperature of the gas flue from 900° C. to 953° C.; in view of the specifics characteristics of the refractory coating of this kiln, it was decided not to increase the temperature of the gas flue further;
an increase in the mean concentration of CO in the gas flue of around 300 ppm to around 1200 ppm.

As the thermal limit of the kiln was reached in the previous phase, an increase of up to at least 1050° C., or even 1100° C. in the case of a higher grade refractory coating, is of course excluded from the following phase. The test was thus continued by directly modifying the distribution of cooling air.

During the following phase (approximately days 11 to 16), the distribution of the cooling air was progressively modified so that finally no more cooling air was injected into the combustion tank. The temperature stabilised at around 960° C. in the gas flue, whereas the mean SO2 in the gas flue reached values of around 3050 ppm.

During this phase, the Applicants observed almost every time peaks of SO2 of up to 8000 ppm, whilst the temperature of the lime removed from the kiln remained less than or equal to 150° C.

During these two phases, the specific consumption of the kiln was around 3600 kJ/kg of lime produced.

In general, due to the circulation of the gases in the gas flue, it may be stated that the flow rate in kilogram per hour (kg/h) of SO2 in the gas flue was stabilised at values corresponding to twice the quantity of sulphur entering the kiln.

After two weeks of operation in these conditions of "low excessive air and 100% cooling air in the preheating tank", the Applicants progressively adjusted the parameters of the kiln in order to restore the standard conditions. The temperature of the gas flue was thus reduced by 35° C. and the SO2 in the gas flue reduced until it reached values close to the initial values (500 ppm).

The invention claimed is:

1. Method for producing quick lime from lime stone in a continuous regenerative shaft kiln, characterised in that, starting with standard conditions of excessive combustion air for the operation of this kiln, it includes a step where the excessive combustion air is progressively reduced until a content greater than 1000 ppm (in volume) of carbon monoxide is reached in a connection gas flue between a plurality of combustion tanks.

2. Method according to claim 1, characterised in that, following the step where the excessive combustion air is progressively reduced, it includes a subsequent step where the temperature of the kiln is progressively increased, until the temperature reaches at least 1050° C. in the gas flue.

3. Method according to claim 2, characterised in that the temperature reaches 1100° C. in the gas flue.

4. Method according to claim 2, characterised in that it includes a subsequent step where the volume of cooling air of at least one of the combustion tanks is progressively reduced, until the temperature of the lime produced does not exceed 150° C.

5. Method according to claim 4, characterised in that the standard conditions of excessive combustion air for the operation of this kiln correspond to an excess of air of between 100% and 130% of the stoichiometric value.

6. Method according to claim 4, characterised in that it includes a measurement of the temperature in the gas flue.

7. Method according to claim 6, characterised in that it includes a measurement of the content of carbon monoxide in the gas flue.

8. Method according to claim 7, characterised in that it includes a measurement of the sulphur dioxide content in the gas flue.

9. Method according to claim 8, characterised in that it includes a measurement of the oxygen content in the gas flue.

10. Method according to claim 1, characterised in that it includes a subsequent step where the volume of cooling air of at least one of the combustion tanks is progressively reduced, until the temperature of the lime produced does not exceed 150° C.

11. Method according to claim 1, characterised in that the standard conditions of excessive combustion air for the operation of this kiln correspond to an excess of air of between 100% and 130% of the stoichiometric value.

12. Method according to claim 1, characterised in that the excessive combustion air is progressively reduced by at least 10% with respect to the standard conditions of excessive combustion air.

13. Method according to claim 1, characterised in that it includes a measurement of the temperature in the gas flue.

14. Method according to claim 1, characterised in that it includes a measurement of the content of carbon monoxide in the gas flue.

15. Method according to claim 1, characterised in that it includes a measurement of the sulphur dioxide content in the gas flue.

16. Method according to claim 1, characterised in that it includes a measurement of the oxygen content in the gas flue.

17. Method according to claim 1, characterised in that an increase in the content of gaseous sulphur dioxide is observed in the gas flue, with respect to the kiln operated in standard conditions.

18. Method according to claim 1, characterised in that the content of gaseous sulphur dioxide reaches 3000 ppm in volume in the gas flue.

19. Method according to claim 17, characterised in that the sulphur dioxide comes from the lime stone used.

20. Method according to claim 17, characterised in that the sulphur dioxide comes from a fuel used.

\* \* \* \* \*